United States Patent [19]

Takeda

[11] 4,325,131

[45] Apr. 13, 1982

[54] TONE ARM BEARING SYSTEM

[75] Inventor: Tamio Takeda, Tokyo, Japan

[73] Assignee: Trio Kabushiki Kaisha, Tokyo, Japan

[21] Appl. No.: 61,914

[22] Filed: Jul. 30, 1979

[30] Foreign Application Priority Data

Aug. 15, 1978 [JP] Japan .......................... 53-111883[U]
Aug. 15, 1978 [JP] Japan .......................... 53-111884[U]

[51] Int. Cl.³ .............................................. G11B 3/18
[52] U.S. Cl. ................................ 369/255; 308/189 A
[58] Field of Search ................. 274/23 R; 308/189 A; 369/255

[56] References Cited

U.S. PATENT DOCUMENTS 2,060,117 11/1936 Proctor ............................ 274/23 R
3,836,155 9/1974 Soannou .......................... 274/23 R
4,062,548 12/1977 Kagata .............................. 274/23 R Primary Examiner—Steven L. Stephan
Attorney, Agent, or Firm—Gerald J. Ferguson, Jr.; Joseph J. Baker

[57] ABSTRACT

In a bearing system for a tone arm for use with a phonograph record player or the like where the bearing system includes a bracket for supporting the tone arm, a rotatable, tubular shaft connected to the bracket for permitting horizontal rotation of the tone arm, and a support for bearing the shaft including ball bearings or the like, the improvement of a suspension wire connected to the bracket at the upper end thereof and extending through the rotatable, tubular shaft; and a device for applying tension to the suspension wire to lessen undesirable movement of the shaft. The tension applying device preferably applies the tension to the suspension wire magnetically and may include a first magnetic structure connected to the lower end of the suspension wire and a second, fixedly positioned magnetic structure spaced from the first magnet structure where at least one of the first and second magnetic structures is a magnet.

19 Claims, 13 Drawing Figures

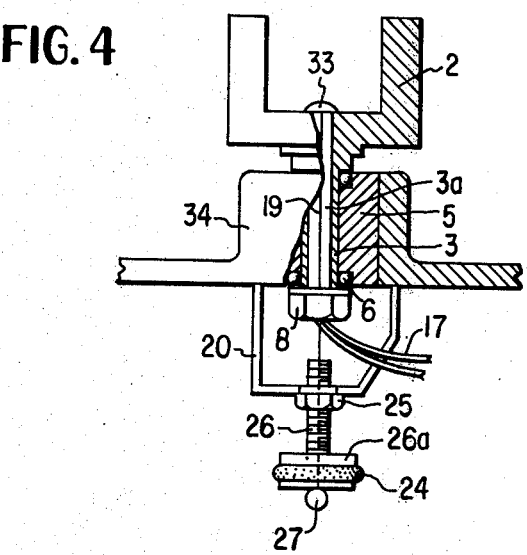
FIG. 4
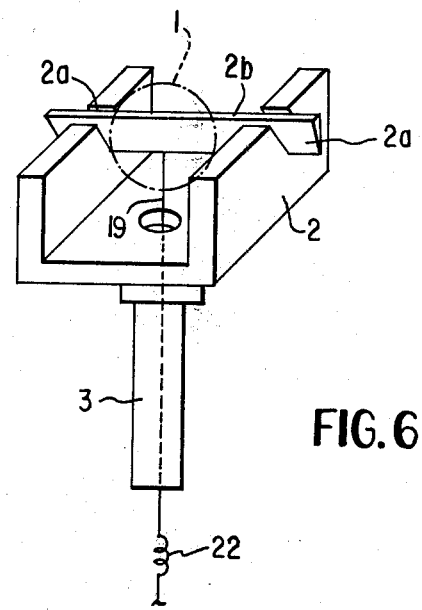
FIG. 6
FIG. 5A
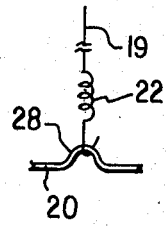
FIG. 5B
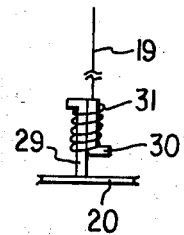
FIG. 5C
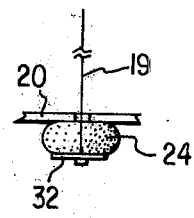
FIG. 10
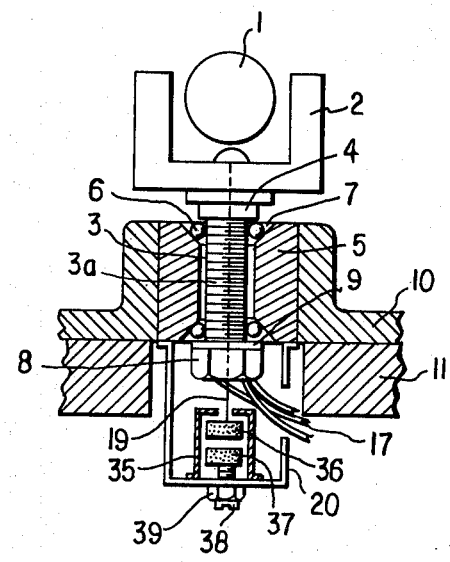

TONE ARM BEARING SYSTEM

BACKGROUND OF THE INVENTION

1. Field of the Invention

This invention relates to a tone arm bearing system.

2. Discussion of the Prior Art

Conventionally, tone arm bearing systems include ball bearings. In the prior art system of FIG. 1, 1 is a tone arm, 2 is a bracket, 3 is a rotatable shaft, 4 is a stop and 5 is a fixed bushing. In order to insert balls 6 and 6' at the top and bottom opening edges, recess 7 and 7' are formed. 8 is a clamping nut for shaft 3, 9 is a washer, 10 is an arm base and 11 is a cabinet. The shape of the above recess 7 and 7' is sometimes stepped as shown in FIGS. 1 and 2A and other times, they are tapered as shown in FIG. 2B.

In the case of FIG. 2A, a space 1 for mechanical precision is formed between ball 6 and recess 7 and a space 1' for adjustment to obtain arm sensitivity is formed between ball 6' and recess 7'. Even in the FIG. 2B type, a space 1' for adjustment is formed.

The above-mentioned spaces 1 and 1' are in fact considered important elements in deciding the quality of the arm since shaking due to these spaces 1 and 1' seriously affect the tone quality. In other words, due to the vibration added to the arm by external sound pressure and vibration received from the player cabinet, the fulcrum of the arm is not fixed and complex shaking occurs in both the vertical and horizontal directions.

Consequently, in the case of conventional bearing systems, the fulcrum of the arm moves in a complex pattern while the arm traces the record surface and shortcomings such as (a) high frequency distortion and tracing distortion result, especially near the arm resonance region, (b) needle jumping readily occurs and (c) the howling characteristic deteriorates.

SUMMARY OF THE INVENTION

This invention is intended to avoid the above shortcomings in a tone arm bearing system and provide a tone arm bearing system that can improve performance by accurately positioning the fulcrum of the rotatable shaft with little, if any, change to the conventional system.

Other objects and advantages of this invention will be apparent from a reading of the following specification and claims taken with the drawing.

BRIEF DESCRIPTION OF THE DRAWING

FIG. 4 is a partial cross-sectional side view showing an illustrative embodiment in which a rubber damper is used as an absorber.

FIGS. 5(A), 5(B) and 5(C) are side views of other embodiments of pulling devices used in the invention.

FIG. 6 is a perspective view of another embodiment of the linkage between a suspension wire and bracket used in the invention.

FIG. 10 is a cross-sectional view of a particularly preferred embodiment of the invention.

DETAILED DESCRIPTION OF PREFERRED EMBODIMENTS OF THE INVENTION

Figure 1:
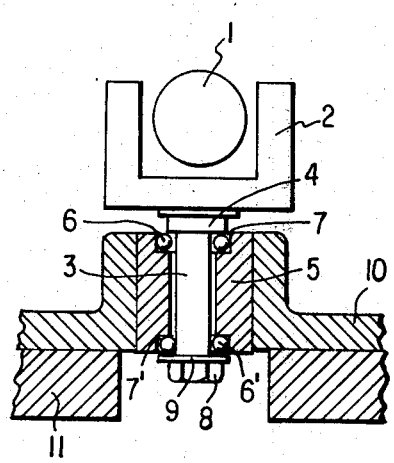
FIGS. 1 and 2A and B are cross-sectional views of prior art tone arm bearing systems.

Reference should be made to the drawing where like reference numerals refer to like parts.

Figure 3:
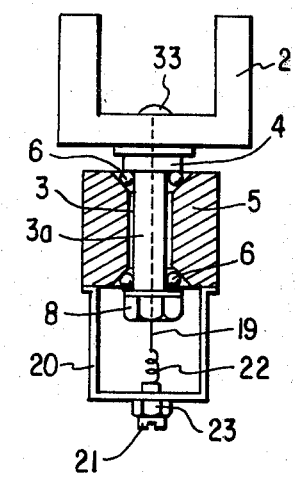
FIG. 3 is a cross-sectional view of a basic embodiment of a tone arm bearing system in accordance with the invention.
Figure 2A:
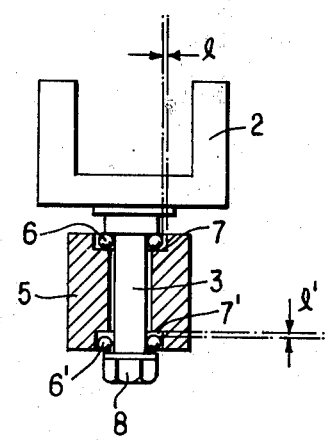
Figure 2B:
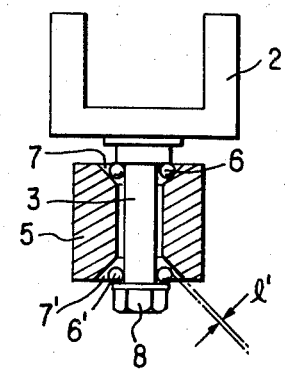

FIG. 3 is a cross-sectional view of an illustrative basic embodiment of the invention where 2 is the bracket, 3 is the rotatable shaft, 4 is the stop, 5 is the fixed bushing and 6 are the bearings balls as in FIGS. 1 and 2. 3a is a lead wire insertion hole installed in rotatable shaft 3 where a lead wire 17 (see FIG. 4) usually enters at the lower end of clamping nut 8 and exits from the center of bracket 2 into the tone arm.

In accordance with invention, a suspension wire 19 is inserted through lead wire insertion hole 3a where one end (the top end) is connected to bracket 2. A pulling device or tension applying means is installed at the other end (the lower end) which pulls or tenses suspension wire 19 so that an appropriate force is added to the rotatable shaft 3 to thereby lessen the shaking caused by the spaces 1 and 1'. The damping torque that acts on rotatable shaft 3 must be rapidly reduced. For this reason, suspension wire 19 is run through lead wire insertion hole 3a, one end being linked to the bracket while the other end is pulled. In order to further reduce the above-mentioned damping torque, it is desirable that the torsional force of suspension wire 19 be as small as possible, and for this purpose, a very thin, high tension wire or a twisted wire is preferred. For example, the above-mentioned damping torque can be reduced to a smaller value than that of lead wire 17 (normally 4–5 pieces).

As a pulling device, a housing 20 may be installed at the lower part of fixed bushing 5 where the pulling force may be adjusted by directly coupling the other end (lower end) of suspension wire 19 to a tension-adjusting screw 21 mounted on the housing. Or, a spring 22 may be placed at the other end of suspension wire 19 as in FIG. 3 so that elastic tension is added. 23 is an adjusting stabilizer nut.

FIG. 4 is a further illustrative embodiment in which a rubber damper 24 is used as an absorber. Suspension wire 19 is inserted through the inside of a sleeve 26, which is vertically adjustable by screwing it into housing 20. Elastic tension is added by rubber damper 24, which is placed between a receiving part 27, which receives the end of wire 19 and washer 26a which is connected to the sleeve. 25 is a nut for stabilizing the sleeve.

Devices for applying elastic tension as above may also be implemented by the embodiments shown in FIG. 5. In FIG. 5(A), spring 22 is formed at the lower end of suspension wire 19, the end of which is hooked onto a hook 28 formed in housing 20. In FIG. 5(B), slide plates 29 and 30 are employed where slide plate 29 is fixed while slide plate 30 is coupled to suspension wire 19. A viscous resisting substance such as silicone grease is preferably disposed between plates 29 and 30 where the plates are spring-slidable with respect to each other as determined by a spring 31. In FIG. 5(C), a rubber damper 24 is placed between housing 20 and the end of suspension wire 19 is connected to a hook plate 32. As indicated in FIG. 5, when the elastic values of an absorber such as spring 22, spring 31, rubber damper 24, etc. are appropriately specified, adjusting means such as screw 21 and nuts 23 and 25 become unnecessary.

As indicated in FIGS. 3 and 4, a hook 33 may be installed at one end (the upper end) of suspension wire 19 to be hooked onto the opening edge of the lead wire insertion hole of bracket 2 as a means for linking the suspension wire and the bracket 2. In FIG. 6, a pivot bearing 2a is formed on bracket 2, and a mounting shaft 2b of tone arm 1 is used as a pivot shaft (knife edge) where one end of suspension wire 19 is hooked onto the mounting shaft.

Figure 7:
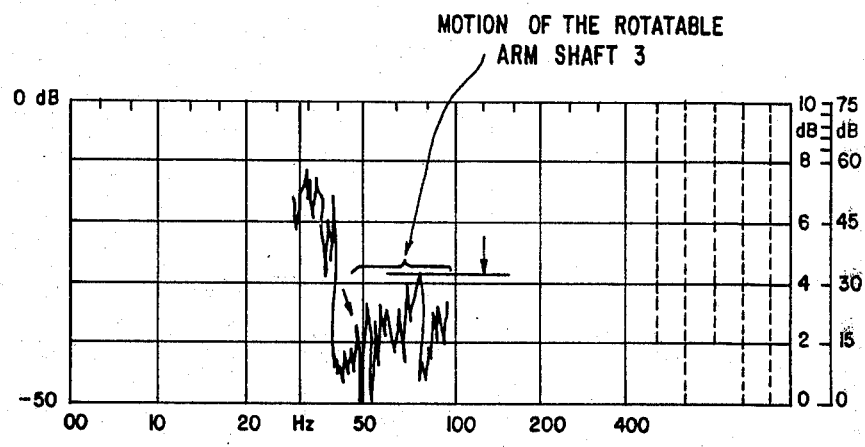
FIG. 7 is a howling characteristic graph of a conventional system.
Figure 8:
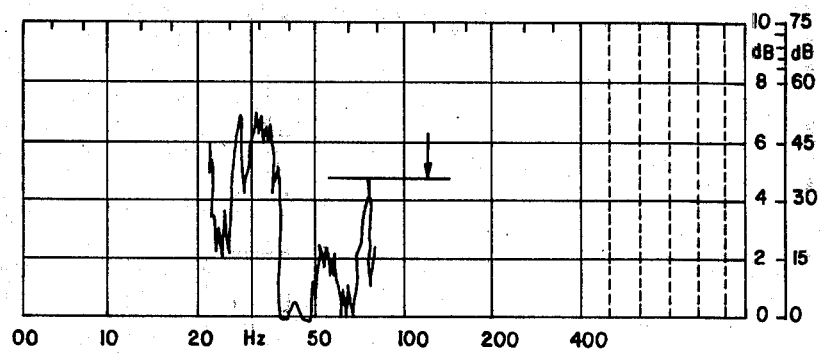
FIGS. 8 and 9 are howling characteristic graphs of systems in accordance with the invention.
Figure 9:
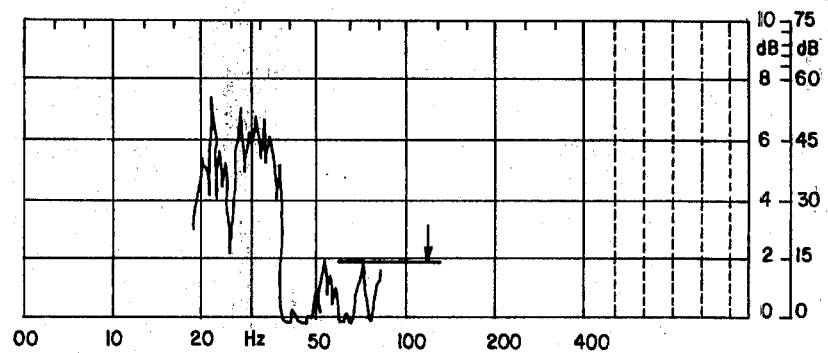

FIGS. 7 through 9 are characteristic comparison graphs of howling tests of a conventional device and the one shown in FIG. 4. FIG. 7 shows the 40-90 Hz howling level of a conventional bearing system. FIG. 8 shows the howling level of the device in FIG. 4 with a condition of slightly insufficient tension of suspension wire 19. FIG. 9 shows the characteristic when the tension of suspension wire 19 is properly set (approx. 300 g).

As is clear from these results, the rotatable shaft of the arm vibrates in a complex manner in FIG. 7. FIG. 8 shows a considerable improvement over that of FIG. 7 with a peak at about 23 dB revealing a slightly insufficient tension. In the case of FIG. 9, the peak has dropped to about 9 dB, showing a very good result.

A further illustrative embodiment of the invention is shown in FIG. 10. In housing 20, a cylindrical guide tube 35 is provided and a disc-shaped magnet 36 is suspended therein where magnet 36 is connected to the other end (the lower end) of suspension wire 19. 37 is a vertically adjustable magnet disposed in guide tube 35, it being adjustable by adjust screw 38 to face magnet 36 with opposite poles facing each other for attraction. Consequently, the tension of suspension wire 19 can be adjusted by the vertical movement of the magnet 37. Further, the suspension wire can freely rotate as rotatable shaft 3 rotates. Thus, the damping torque associated with twisting of wire 19 does not occur at all. 39 is a stabilizing nut for screw 38. It should also be noted one of the magnets 36 and 37 can be replaced with a strongly magnetic material such as iron, etc.

The embodiment of FIG. 10 is thus particularly preferred in that it provides a tone arm bearing system which optimally applies spring tension to suspension wire 19. It eliminates transmission of mechanical vibration to the suspension wire and furthermore, enables the complete elimination of damping torque on the rotatable shaft, which may be caused by the twisting of the suspension wire associated with the horizontal rotational movement of the rotatable shaft.

When the tone arm bearing system of this invention is used, the fulcrum is accurately positioned by the appropriate pressure applied to the horizontally rotatable shaft 3 of the tone arm by suspension wire 19 so that shaking of the rotatable shaft can be lessened. Thus, not only high frequency distortion and tracing distortion can be lessened, but the occurrence of needle jumping can also be lessened. Accordingly, the howling characteristics can be markedly improved. Moreover, means are provided to so pull the suspension wire that damping torque against the rotatable shaft can be lessened. Further, the foregoing advantages are implemented with little, if any, change to the conventional system. Also, with respect to the embodiment of FIG. 10 where the lower end of the suspension wire is pulled by magnetic action, mechanical vibration is not transmitted to the suspension wire, and damping torque on the rotation shaft, which tends to occur due to twisting of the suspension wire, can be completely eliminated.

What is claimed is:

1. In a bearing system for a tone arm for use with a phonograph record player or the like where the bearing system includes a bracket for supporting said tone arm, a rotatable, tubular shaft connected to said bracket for permitting horizontal rotation of said tone arm, and support means for bearing said shaft including ball bearings or the like, the improvement comprising
   a suspension wire attached to said bracket at the upper end thereof and extending through said rotatable, tubular shaft; and
   means for applying tension to said suspension wire to lessen undesirable movement of said shaft.

2. The improvement as in claim 1 where said tension applying means includes means for magnetically applying the tension to the suspension wire.

3. The improvement as in claim 2 including a first magnetic means connected to the lower end of the suspension wire and second, fixedly positioned magnetic means spaced from said first magnet means where at least one of said first and second magnetic means is a magnet.

4. The improvement as in claim 3 including means for adjusting the position of said second magnetic means with respect to said first magnet means to adjust the tension in the suspension wire.

5. The improvement as in claim 1 where said tension applying means includes a fixed member fixedly connected with respect to said support means for the rotatable shaft.

6. The improvement as in claim 5 including tension adjusting means connected to the lower end of said suspension wire, said tension adjusting means being movably connected with respect to said fixed member.

7. The improvement as in claim 5 where said suspension wire is directly connected to said fixed member so that said tension is inelastically applied to the suspension wire.

8. The improvement as in claim 5 where said tension applying means includes means disposed between said suspension wire and said fixed member for elastically applying said tension to said suspension wire.

9. The improvement as in claim 8 where said means for elastically applying tension to said suspension wire includes means for magnetically applying the tension to the suspension wire.

10. The improvement as in claim 8 where said means for elastically applying tension to said suspension wire includes a spring.

11. The improvement as in claim 8 where said means for elastically applying tension to said suspension wire includes a rubber damper.

12. The improvement as in claim 8 where said means for elastically applying tension to said suspension wire includes a first slidable member connected to the lower end of the suspension wire and a second slidable member connected to the fixed member and means for maintaining said first and second slidable members in sliding engagement with one another.

13. The improvement as in claim 1 where said upper end of the suspension wire is hooked over an opening in the bracket.

14. The improvement as in claim 1 where said bracket includes a pivot bearing and a mounting shaft supported by the pivot bearing, the upper end of the suspension wire being connected to the mounting shaft.

15. The improvement as in claims 1 or 5 including at least one lead wire extending through said tubular shaft where the damping torque exerted on the tone arm by the suspension wire is less than that exerted by the lead wire.

16. The improvement as in claim 1 where the suspension wire is a thin, high tension wire or a twisted wire.

17. In a bearing system for a tone arm for use with a photograph record player or the like where the bearing system includes a bracket for supporting said tone arm, a rotatable, tubular shaft connected to said bracket for permitting horizontal rotation of said tone arm, and support means for bearing said shaft including ball bearings or the like, the improvement comprising an elongated member attached to said bracket at the upper end thereof and extending through said rotatable, tubular shaft; and magnetic means for magnetically applying tension to said elongated member to lessen undesirable movement of said shaft with respect to said support means.

18. The improvement as in claim 17 including a first magnetic means connected to the lower end of the elongated member and a second, fixedly positioned magnetic means spaced from said first magnetic means where at least one of said first and second magnetic means is a magnet.

19. The improvement as in claim 18 including means for adjusting the position of said second magnetic means with respect to said first magnetic means to adjust the tension applied to the elongated member.

* * * * *